(12) United States Patent
Dubov et al.

(10) Patent No.: US 11,619,039 B2
(45) Date of Patent: Apr. 4, 2023

(54) THREE-DIMENSIONAL PRINTED BUILDING COMPONENTS AND STRUCTURES

(71) Applicant: Mighty Buildings, Inc., San Francisco, CA (US)

(72) Inventors: Aleksei Dubov, Moscow (RU); Anna Ivanova, Tomsk (RU)

(73) Assignee: Mighty Buildings, Inc., San Francisco, CA (US)

( * ) Notice: Subject to any disclaimer, the term of this patent is extended or adjusted under 35 U.S.C. 154(b) by 605 days.

(21) Appl. No.: 16/810,657

(22) Filed: Mar. 5, 2020

(65) Prior Publication Data

US 2021/0277648 A1    Sep. 9, 2021

(51) Int. Cl.
*E04B 1/14*    (2006.01)
*B33Y 80/00*   (2015.01)
(Continued)

(52) U.S. Cl.
CPC ............ *E04B 1/14* (2013.01); *B29C 65/1406* (2013.01); *B33Y 10/00* (2014.12); *B33Y 40/20* (2020.01);
(Continued)

(58) Field of Classification Search
None
See application file for complete search history.

(56) References Cited

U.S. PATENT DOCUMENTS 4,545,159 A * 10/1985 Rizk ................. E04B 1/3483
                                                        52/79.9
5,596,853 A *  1/1997 Blaney ............... E04C 2/044
                                                       52/223.7
(Continued)

FOREIGN PATENT DOCUMENTS

WO    2017/040883 A1    3/2017
WO    2017/112521 A1    6/2017

OTHER PUBLICATIONS

International Search Report in PCT International Application No. PCT/US21/20971, dated May 18, 2021.
(Continued)

*Primary Examiner* — Mohammad M Ameen
(74) *Attorney, Agent, or Firm* — Cognition IP, P.C.; Edward Steakley; Justin White

(57) ABSTRACT

A residential or commercial building, structure, or building component can include an exterior member, interior member, and plurality of cross-members spatially disposed therebetween. Each of the exterior member, interior member, cross-members can be formed from a multi-layered stack of polymeric material made by a layered three-dimensional printing process, and all can be monolithically integrated. An exterior surface region of the exterior member can have an integrally formed surface finish. Overlying finishing or connective layers can be added. The exterior and interior members can be configured in a parallel arrangement to form a rectangular or curve shaped building block. A fill material can be disposed into openings between the exterior and interior members, and an interior surface region at the interior member can include a cavity configured for an electrical box, plumbing, or a sensing device.

47 Claims, 8 Drawing Sheets

(51) Int. Cl.
    *E04B 5/00*     (2006.01)
    *E04C 2/20*     (2006.01)
    *E04C 1/39*     (2006.01)
    *E04B 1/94*     (2006.01)
    *E04C 2/36*     (2006.01)
    *E04B 1/74*     (2006.01)
    *B29C 65/14*     (2006.01)
    *B33Y 10/00*     (2015.01)
    *B33Y 40/20*     (2020.01)
    *B33Y 70/00*     (2020.01)

(52) U.S. Cl.
    CPC ............... *B33Y 70/00* (2014.12); *B33Y 80/00* (2014.12); *E04B 1/74* (2013.01); *E04B 1/941* (2013.01); *E04C 1/24* (2013.01); *E04C 1/397* (2013.01); *E04C 2/20* (2013.01); *E04C 2/365* (2013.01); *E04B 2001/745* (2013.01)

(56) References Cited

U.S. PATENT DOCUMENTS

2005/0252134 A1* 11/2005 Makovich ................. E04C 1/41
                                                                                     52/503
2014/0110872 A1* 4/2014 Levy ..................... B29C 64/124
                                                                                     425/143
2018/0328019 A1* 11/2018 Collins ..................... E04B 5/12
2022/0274880 A1* 9/2022 Pont .......................... B28B 3/20

OTHER PUBLICATIONS

M. Retailleau et al., "Dual-cure photochemical/thermal polymerization of acrylates: a photoassisted process at low light intensity," Polymer Chemistry 5, 6503 (2014).

* cited by examiner

THREE-DIMENSIONAL PRINTED BUILDING COMPONENTS AND STRUCTURES

CROSS-REFERENCE TO RELATED APPLICATION

This application is related to U.S. patent application Ser. No. 16/276,521 filed on Feb. 14, 2019 and entitled "3D PRINTED MATERIAL, STRUCTURE AND METHOD FOR MAKING THE SAME," which is hereby incorporated by reference in its entirety.

TECHNICAL FIELD

The present disclosure relates generally to buildings, and more particularly to building components and structures formed from three-dimensional printing processes.

BACKGROUND

Traditional residential and commercial building planning and construction processes can be complicated and inefficient. Such processes may involve designing the building, creating a floor plan, obtaining permits, hiring architects, contractors, carpenters, electricians, plumbers, and other professionals, and incurring inspections of the building structures at various times during construction. Numerous disparate processes and materials are typically required to form foundations, framing, plumbing, electrical systems, drywall, and the like. Construction of a new building often takes many months to complete and requires multiple contractors, specialists, workers, and various inspections as construction proceeds.

Although traditional ways of constructing residential and commercial buildings have worked well in the past, improvements are always helpful. In particular, what is desired are simplifications and reductions in the amounts of different materials, specialists, and overall time needed to construct such buildings.

SUMMARY

It is an advantage of the present disclosure to provide simplifications and reductions in the amounts and types of materials needed to construct residential and commercial buildings. The disclosed features, apparatuses, systems, and methods provide improved building construction solutions that involve fewer materials and thus fewer building specialists and less time to construct these buildings. These advantages can be accomplished at least in part by providing buildings, structures, and building components that are formed by three-dimensional ("3D") printing processes.

In various embodiments of the present disclosure, a building, building component, or structure can include a multi-layered stack of polymeric material, an exterior member formed from the multi-layered stack, an interior member formed from the multi-layered stack, and a plurality of cross-members formed from the multi-layered stack. The polymeric material can have a methacrylic monomer, an inorganic hydrate and a light-induced polymerization agent. The multi-layered stack can be formed from a layer by layer three-dimensional printing process and can have a stack thickness. The three-dimensional printing process can involve layer to layer chemical adhesion achieved by applying ultraviolet light to instantly cure extruded material. It will be understood that reference to a multi-layered stack of polymeric material means cured or otherwise hardened composite material used in a 3D printing process unless designated otherwise. The exterior member can have an exterior surface region and the interior member can have an interior surface region. Each of the plurality of cross-members can be spatially disposed between the exterior member and the interior member.

In various detailed embodiments, the building, building component, or structure can form all or part of a residential or commercial building. A building component can stand alone or be part of a plurality of specially designed components assembled together to form all or part of a residential or commercial building. The exterior member, interior member, and plurality of cross-members can all be monolithically integrated to form the building component. In some arrangements, the stack thickness can be about 6 to 100 mm, and each layer of polymeric material in the multi-layered stack can have a layer thickness that ranges from about 6 to 25 mm. Each of the individual layers can be configured by extruding uncured polymeric material in a liquified state and solidifying the material into the layer to form the stack thickness. The exterior surface region can be characterized by a texture having a surface roughness of about 0 to 4 mm and can have a height of about 2 to 10 mm per layer of the multi-layered stack. The polymeric material at the exterior surface region can include an integrally formed finish with coarse-grained texture and with a line pattern caused by the layer-by-layer extrusion. The finish can be marble-like having a flat surface and a non-foliated texture.

In various further detailed embodiments, the building, building component, or structure can include an overlying finishing layer of stucco, paint, primer, self-leveling floor, roof, varnish, or UV-protective coating, an overlying connective layer of epoxy, adhesive, or sealant coating, or both. The exterior member and interior member can be configured in a parallel arrangement to form a building block, which can be shaped as a rectangle, a box, or a curved structure. In some arrangements, a plurality of openings can be disposed between the exterior member and the interior member. A fill material can be spatially disposed within the plurality of openings, which fill material can be an insulating material, a polyurethane foam, or a coconut fiber foam. In some arrangements, the interior surface region can include a cavity, which cavity can be configured for an electrical box, plumbing, or a sensing device.

In still further detailed embodiments, the building, building component, or structure can be fire resistant and characterized by a fire rating of class A, and a one-hour or two-hour fire penetration with a flame spread index of 0-200 and a smoke developed index of 0-450. The building, building component, or structure building can withstand a minimum of 15 years of thermocycling from about −60 to +80 C, the influence of natural moisture and salt, and a load on the dowel of about 5 to 100 kg. The multi-layered stack of polymeric material can include a coloring agent, can be hydrophobic, or both. In addition, the multi-layered stack of polymeric material can be characterized by an ultimate compressive strength of 37±3 MPa along the layers and 50±4 MPa across the layers, a compressive modulus of elasticity of 1900±130 MPa along the layers and 1400±460 MPa across the layers, an ultimate tensile strength of 3.9±0.6 MPa along the layers and 2.7±0.2 MPa across the layers, a tensile modulus of elasticity of 2100±750 MPa along the layers and 1100±170 MPa across the layers, a thermal conductivity of about 0.1-0.8 W/(m·K), a vapor permeability of about 1.7 perm·inch, a thermal inertia of about 650-750 (J*m-2*K-1*sec-½), and a porosity of less than about 3%.

In various further embodiments of the present disclosure, a building can include a plurality of the foregoing building components arranged to form at least a portion of a wall, floor, and roof for the building. In various detailed embodiments, at least one of these plurality of building components can form a complete structural portion of the building, which complete structural portion can include walls, floor and a roof. Any or all of the foregoing details and limitations in any combination may also apply to the building.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for creating three-dimensional buildings, structures, and building components. These drawings in no way limit any changes in form and detail that may be made to the disclosure by one skilled in the art without departing from the spirit and scope of the disclosure.

DETAILED DESCRIPTION

Figure 1:
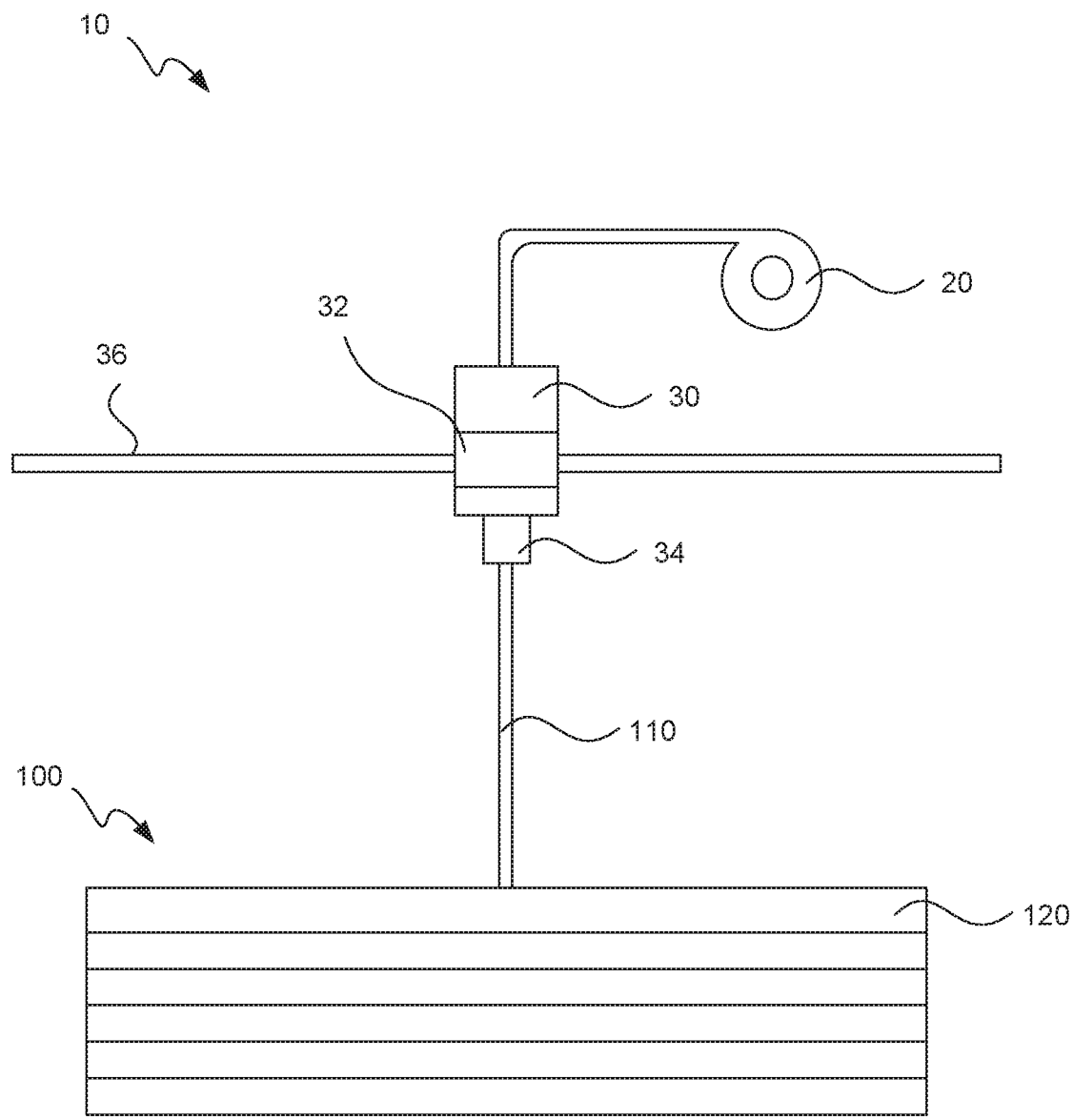
FIG. 1 illustrates in diagrammatic view an exemplary extrusion-based 3D printing process according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for creating buildings, structures, and building components using 3D printing processes. The disclosed embodiments can include a single 3D printed building component, an entire 3D printed building, or a 3D printed structure forming at least a portion of a building. In particular, the disclosed embodiments can utilize an extrusion-based 3D printing process to form buildings and building components of a wide variety of complex shapes and sizes with specially formulated composite polymer materials having material properties that meet or exceed standard building codes.

Various ways of strategically designing and 3D printing buildings and building components can allow for simplifications and reductions in the amounts and types of materials needed to construct residential and commercial buildings. For example, specially formulated polymer materials used in the 3D printing process can take the place of cement, wood, steel, drywall, and other structural materials to form foundations, structural support members, floors, walls, ceilings, roofs, and other structural components. In some arrangements, various building components and sub-structures can be 3D printed in modular fashion at one location and then readily assembled at a construction site at a later time.

Although various embodiments disclosed herein discuss residential and commercial buildings, it will be readily appreciated that the disclosed features, apparatuses, systems, and methods can similarly be used for sheds, storage units, industrial buildings, garages, and many other types of building and building components. For example, the disclosed features and embodiments can be used to construct a portion of an industrial factory. Other applications, arrangements, and extrapolations beyond the illustrated embodiments are also contemplated.

In various detailed examples, which are merely illustrative and non-limiting in nature, a 3D printing manufacturing process can involve a layer-by-layer extrusion process where each layer is dynamically cured by exposure to ultraviolet ("UV") light. In some arrangements, a big area additive manufacturing ("BAAM") process or similar large-scale 3D printing process may be used. The material used for the 3D printing process can be a composite material that includes a specialized polymer formulation with one or more additional components included. With this composite material, the 3D printed building component or structure can have material properties that meet or exceed building codes.

Referring first to FIG. 1A, an exemplary extrusion-based 3D printing process is illustrated in diagrammatic view. 3D printing system 10 can include a composite material source 20, an extrusion-based 3D printer 30 having a heating component 32 and a nozzle 34, and a track 36 about which the 3D printer 30 can travel. The 3D printer 30 can eject a liquified composite material 110 to form a multi-layered stack of polymer material 100 having a plurality of layers 120. In various embodiments, the thickness of each layer 120 may be varied from about 6 to 25 mm, the stack thickness for the overall multi-layer stack can be about 6 to 150 mm, and the printing speed may be applied in the range of about 40 to 350 mm/s. Again, it will be understood that reference to a multi-layered stack of polymeric material means cured or otherwise hardened composite material used in the printing process.

In various embodiments, the formulation for a composite material 110 to be used in the 3D printing process may include an organic matrix, an inorganic hydrate, a functional filler, and a UV initiator. When cured into a final form as a building or building component, the hardened composite material (i.e., multi-layered stack of polymer material) can be fire resistant and characterized by a fire rating of class A, and a one-hour or two-hour fire penetration with a flame spread index of 0-200 and a smoke developed index of 0-450. In addition, the hardened composite material can be hydrophobic and have good thermal conductivity properties, which prevents the printed buildings, structures, and building components from having cold joints or thermal bridging. Further, the hardened composite material can withstand a minimum of 15 years of thermocycling from about −60 to +80 C, the influence of natural moisture and salt, and a load on the dowel of about 5 to 100 kg. As will be readily appreciated, load on the dowel refers to the amount of load that the structural material can bear when supporting a dowel type connector or fastener.

Focusing first on only the specially formulated composite material 110, various exemplary components, formulations, and material properties that can be used for this composite polymer material will now be provided. In various exemplary embodiments, the organic matrix used for composite material 110 can be triethylene glycol dimethacrylate ("TEGDMA"). TEGDMA is a hydrophilic, low viscosity, difunctional methacrylic monomer employed as a crosslinking agent. TEGDMA is a transparent liquid that can range between about 10 to 55 percent weight of the formulation for composite material 110. Various properties of TEGDMA are set forth below in Table 1.

TABLE 1

| Triethylene Glycol Dimethacrylate (TEGDMA) | |
|---|---|
| Parameter | Value |
| Chemical formula | $CH_2=C(CH_3)COO(CH_2CH_2O)_3COC(CH_3)=CH_2$ |
| Density, g/mL | 1.092 |
| Refractive index | 1.46- 1.508 |
| State of Matter | Liquid |
| Color | Transparent |

Composite material 110 may also include different organic components. In some embodiments, one of the organic components can include one or more acrylic oligomers. In some arrangements, a given composite component may be pre-polymerized in order to enhance the viscosity of the composite. In some configurations, a combination of inorganic fillers including at least one functional filler and an inorganic hydrate may be used. The inorganic hydrate can be an inorganic mineral possessing the initial dehydration temperature range needed to keep the temperature of the composite below the autocatalytic threshold during printing and the refractive index conforming to the refractive index of the cured organic matrix.

In some configurations, the inorganic hydrate may be borax decahydrate. Borax decahydrate is a solid white powder that can be provided in large bags for industrial use. In some non-limiting examples, borax decahydrate can range between about 5 to 45 percent weight of the formulation for composite material 110 when combined with the functional fillers. Various properties of borax decahydrate are set forth below in Table 2.

TABLE 2

| Borax Decahydrate | |
|---|---|
| Parameter | Value |
| Chemical formula | $Na_2B4O_7 \cdot 10H_2O$ |
| State of Matter | Solid Powder |
| Volume weight | 0.85 g/cm$^3$ |
| Refractive index | 1.46-1.47 |
| Initial decomposition temperature | 60-70° C. |
| Foreign impurities | No impurities |
| Particle size distribution | D (10) 110 ± 20 µm |
| | D (50) 310 ± 40 µm |
| | D (90) 700 ± 120 µm |
| | D max 2800 ± 300 µm |
| Solubility in organic matrix | Insoluble |

In various embodiments, a light-induced polymerization agent may be used. For example, a UV initiator can be used to induce polymerization of the organic matrix under UV-light of a specified wavelength. In some arrangements, a UV initiator may include one or more bisacylphosphine oxides ("BAPO"). Various properties of BAPO are set forth below in Table 3.

TABLE 3

| Bisacylphosphine oxides | |
|---|---|
| Parameter | Value |
| Chemical formula | Phenylbis(2,4,6-trimethylbenzoyl) phosphine oxide |
| State of Matter | Solid Powder |
| Color | Yellow |

One non-limiting example for the formulation of composite material 110 can be called "Example Formulation."

Specific components and quantities for this Example Formulation are set forth below in Table 4. This material polymerizes exothermically exposed to ultraviolet light.

TABLE 4

Components of Photopolymer Composite for 3D Printing Example Formulation

| Components | Quantity Range |
|---|---|
| Organic Matrix (TEGDMA) | 53-57 w % |
| Inorganic Hydrate (Borax Decahydrate) | 43-47 w % |
| UY Initiator (BAPO) | 0.01 w % |

In general, the physical state and appearance of this particular Example Formulation is a viscous paste. This Example Formulation is mostly colorless with some white inclusions, and may be colored to be black, white, gray, brown, beige, light beige, green, light green, orange. This Example Formulation has a weak odor, a pH of 7-8, a viscosity of 120000-250000 cps at t=20° C., and a density of 1350 kg/m3.

Table 5 below provides some mechanical properties for parts and components printed and hardened by using the Example Formulation in two different directions, both along and across the printed layers.

TABLE 5

Properties of 3D Printed Composite Material Example Formulation

| Mechanical Property | Along | Across |
|---|---|---|
| Ultimate compressive strength, MPa | 37 ± 3 | 50 ± 4 |
| Compressive modulus of elasticity, | 1900 ± 130 | 1400 ± 460 |
| Relative compressive deformation, % | 9.5 ± 1.2 | 13.0 ± 1.6 |
| Ultimate tensile strength, MPa | 3.9 ± 0.6 | 2.7 ± 0.2 |
| Tensile modulus of elasticity, MPa | 2100 ± 750 | 1100 ± 170 |
| Relative tensile deformation, % | 0.20 ± 0.05 | 0.26 ± 0.04 |
| Ultimate flexural strength, MPa | 13.0 ± 1.8 | 11.0 ± 0.9 |
| Flexural modulus of elasticity, MPa | 1800 ± 140 | 1400 ± 110 |
| Relative flexural deformation, % | 0.7 ± 0.13 | 0.8 ± 0.08 |

While the foregoing component materials, Example Formulation, and various properties thereof have been provided by way of example, it will be readily appreciated that numerous other suitable component materials and composite formulations having varied properties may also be used for 3D printing the various buildings, structures, and building components disclosed herein. It is specifically contemplated that all such suitable component materials and composite formulations may also be used.

Figure 2A:
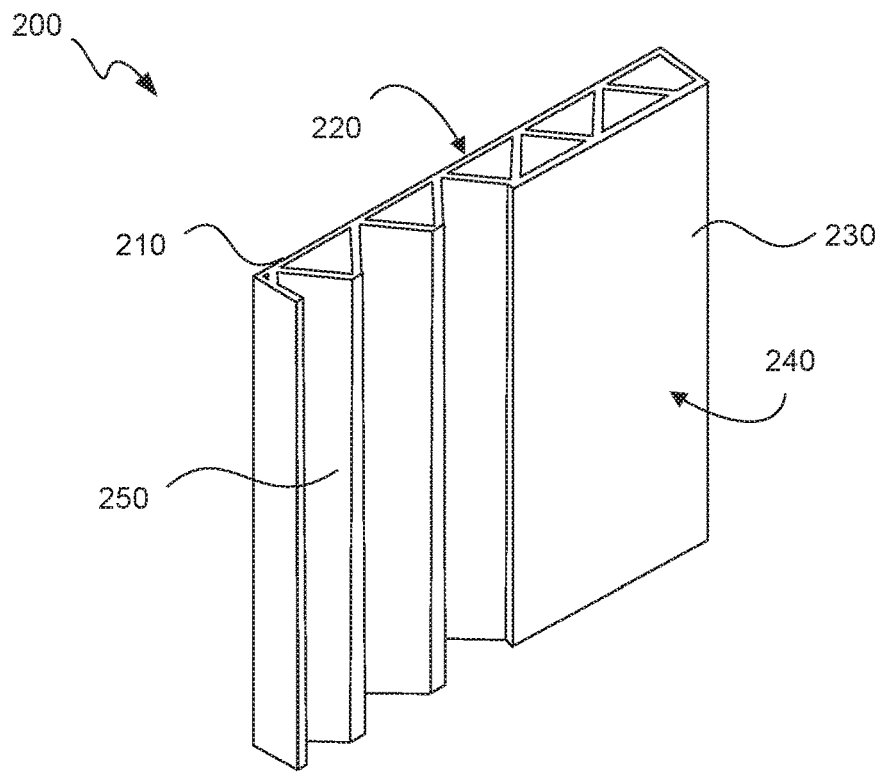
FIG. 2A illustrates in front perspective partial cutaway view an exemplary 3D printed building component according to one embodiment of the present disclosure.

Transitioning to FIG. 2A, an exemplary 3D printed building component is illustrated in front perspective and partial cutaway view. Printed building component 200 can include an exterior member 210 having an exterior surface region 220, an interior member 230 having an interior surface region 240, and a plurality of cross-members 250 spatially disposed between the exterior member 210 and the interior member 230. Each of the exterior member 210, interior member 230, and cross-members 250 can be formed from a multi-layered stack of polymeric material, such as that which is detailed above.

Cross-members 250 can bear loads and provide support for the exterior member 210 and interior member 230 and can be arranged in a variety of different sizes, angles, patterns, and configurations. For example, some cross-members may be arranged to be perpendicular to the exterior member 210 and interior member 230, while others may be arranged at various non-perpendicular angles. Cross-members 250 may have the same or variable thicknesses and may be spaced apart by the same or varying distances from each other. Due to the typical 3D printing process that creates the entire printed building component monolithically, cross-members 250 may be integrally formed at joints or intersections with the exterior member 210 and interior member 230. In some arrangements, various cross-members 250 may be configured with slots, openings, or other features designed to accommodate electrical cabling, pipes, ventilation, and other desired construction components.

Printed building component 200 can be, for example, a floor, wall, ceiling, roof, or portion thereof for an overall building. As shown, exterior member 210 and interior member 230 can be configured in a parallel arrangement, such that a building block is formed. In this example, a box or rectangular building block has been formed. While printed building component 200 has a number of items and features, it will be appreciated that the entirety of printed building component 200 can be formed from a single 3D printing process, such as that which is set forth above. In various embodiments, the plurality of cross members 250 can provide structural integrity and strength for the overall printed building component 200, such that the exterior member 210, interior member 230, or both can be fairly thin in nature.

Figure 2B:
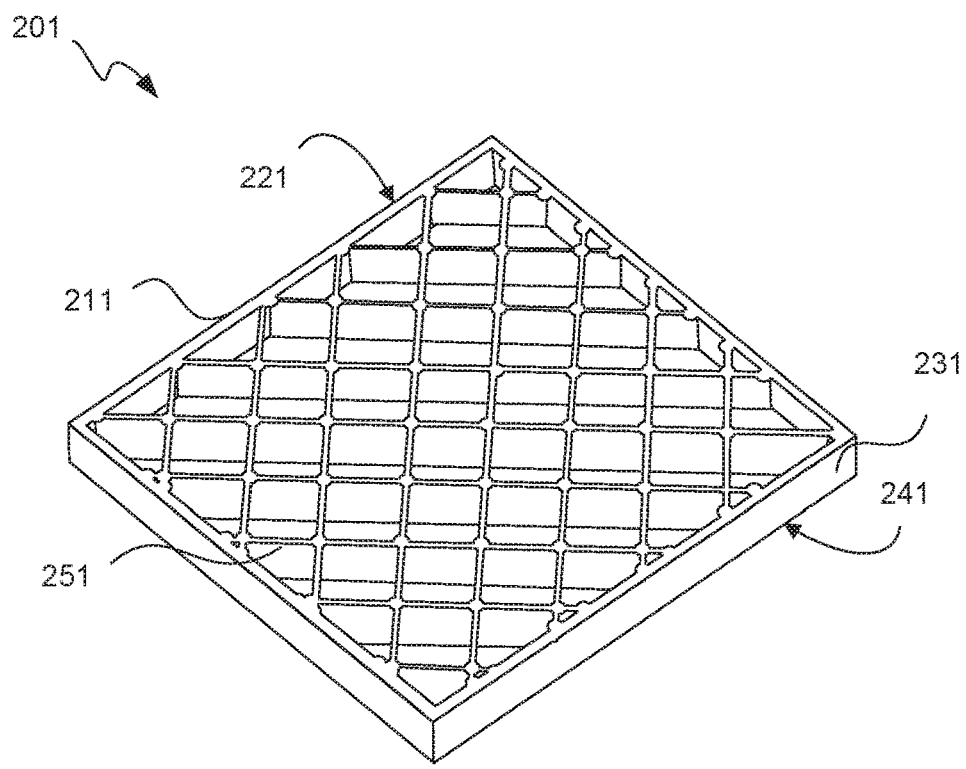
FIG. 2B illustrates in top perspective view an exemplary alternative 3D printed building component according to one embodiment of the present disclosure.

FIG. 2B illustrates in top perspective view an exemplary alternative 3D printed building component. Similar to the foregoing embodiment, printed building component 201 can include an exterior member 211 having an exterior surface region 221, an interior member 231 having an interior surface region 241, and a plurality of cross-members 251 spatially disposed between the exterior member 211 and the interior member 231. Again, each of the exterior member 211, interior member 231, and cross-members 251 can be formed from a multi-layered stack of polymeric material. Printed building component 201 can be, for example, a floor or portion of a floor for an overall building.

Figure 2C:
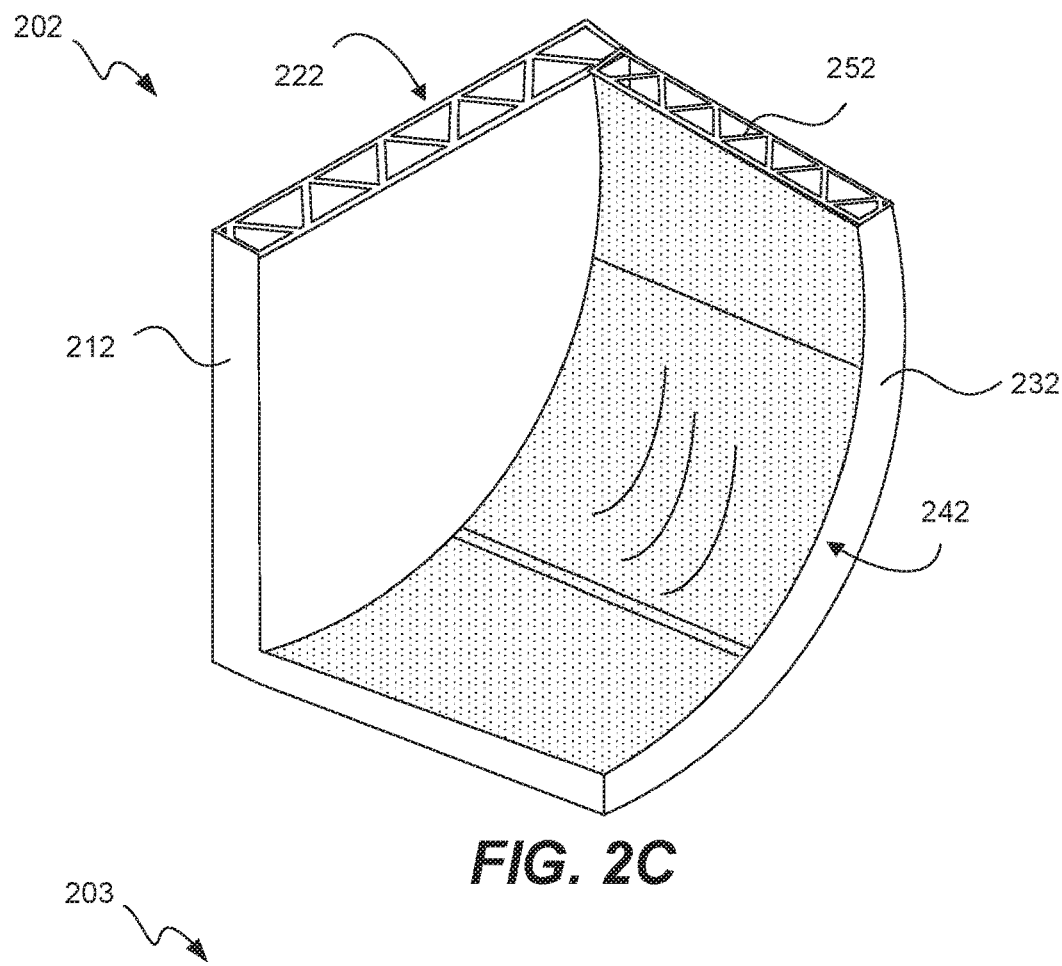
FIG. 2C illustrates in front perspective view another exemplary alternative 3D printed building component according to one embodiment of the present disclosure.
Figure 2D:
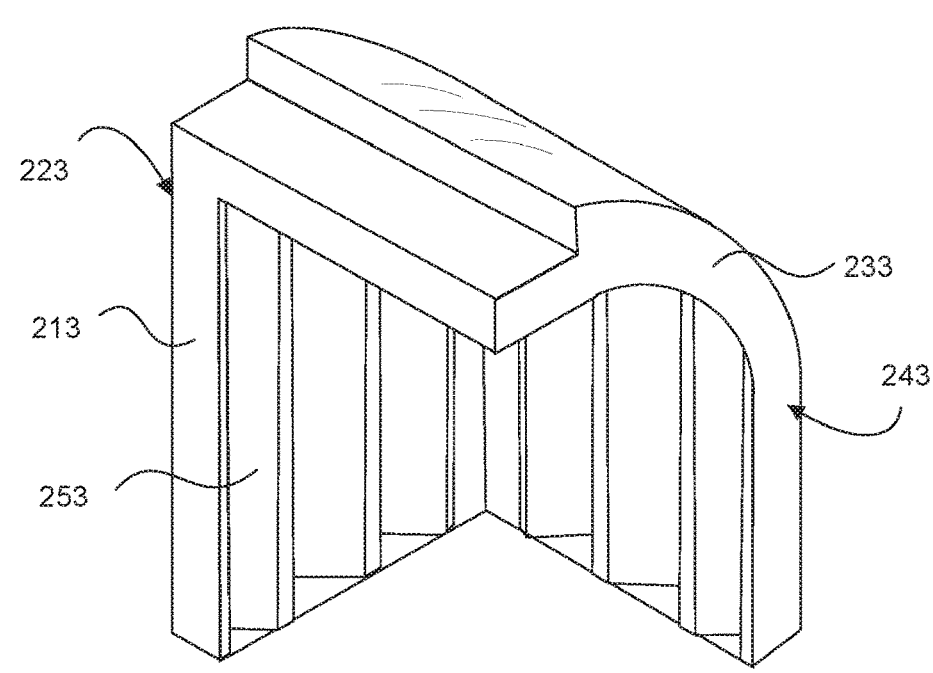
FIG. 2D illustrates in front perspective view still another exemplary alternative 3D printed building component according to one embodiment of the present disclosure.

Continuing with FIGS. 2C and 2D further exemplary alternative 3D printed building components are shown in front perspective view. Both of printed building component 202 and printed building component 203 include curved portions and other complex features, all of which can be readily formed by way of a 3D printing process that forms the entire building component at once. Printed building component 202 can include an exterior member 212 having an exterior surface region 222, an interior member 232 having an interior surface region 242, and a plurality of cross-members 252, while printed building component 203 can include an exterior member 213 having an exterior surface region 223, an interior member 233 having an interior surface region 243, and a plurality of cross-members 253. Again, each member can be formed from a multi-layered stack of polymeric material.

As in the foregoing examples, each of the exterior members and their respective interior members are configured in a parallel arrangement to form a building block. Rather than a box or rectangular structure, however, printed building component 202 and printed building component 203 both form building blocks having a curved structure. Building component 202 can be, for example, a portion of a straight wall, portion of a curved wall, and portion of a floor. Building component 203 can be, for example, a portion of a straight wall, a portion of a curved wall, and a portion of a curved ceiling. For each of building components 201, 202, 203, and 204, the exterior member, the interior member, and the plurality of cross-members can all be monolithically integrated, such as where each building component is created from a single 3D printing process. The nature of 3D printing can also allow for various surface features and finishes in the printed polymeric material, as set forth below.

Figure 3A:
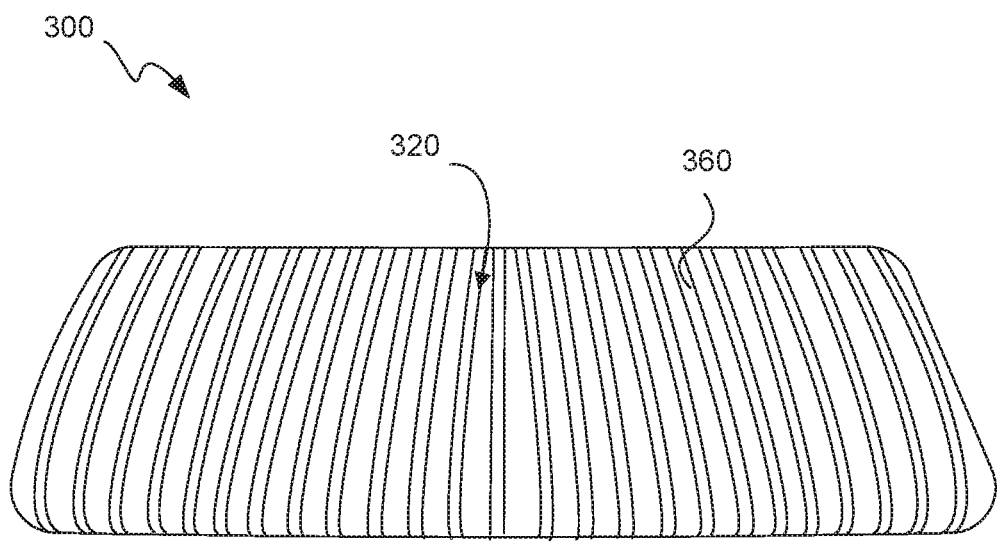
FIG. 3A illustrates in top perspective view an exemplary surface finish for a 3D printed building component according to one embodiment of the present disclosure.

Moving next to FIG. 3A, an exemplary surface finish for a 3D printed building component is shown in top perspective view. Printed building component 300 can include an exterior surface region 320 that is formed only from the printed composite material. Due to the nature of 3D printing, a ribbed, rugged, or otherwise textured finish 360 can be integrally formed in the material at exterior surface region 320 as part of the 3D printing process. Various grades of surface roughness can also be used at the exterior surface. For example, exterior surface region 320 can be characterized by a texture having a surface roughness of about 0 to 4 mm.

Figure 3B:
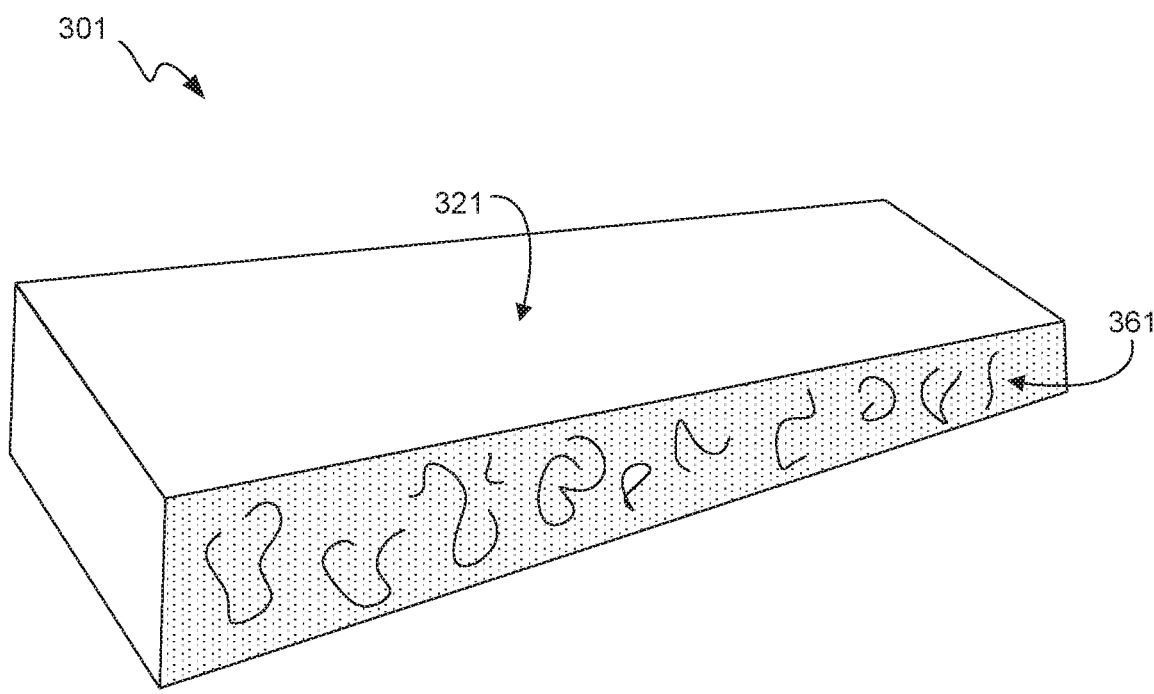
FIG. 3B illustrates in side perspective view an exemplary alternative surface finish for a 3D printed building component according to one embodiment of the present disclosure.

FIG. 3B illustrates in side perspective view an exemplary alternative surface finish for a 3D printed building component. In addition to being integrally formed by a printing process, the surfaces of various 3D printed building components can be easily treated by milling tools and other finishing equipment, which treatments are impossible for concrete and other traditional building materials. Printed building component 301 can include a first exterior surface region 321 and a second exterior surface region 361 that are formed only from the printed composite material. First exterior surface 321 region may be polished to have a smooth surface. As an alternative finishing treatment, second exterior surface region 361 may be milled in a manner that results in a marble-like type of surface.

It will be readily appreciated that other types of surfaces may also be accomplished just by treating the exterior of the polymer material. In addition, the color of a 3D printed building, structure, or building component may be adjusted as desired by adding one or more inert coloring agents to the composite material prior to printing. Printed building component colors can include, for example, black, white, pink, gray, brown, beige, light beige, green, light green, and orange, among others.

Figure 4A:
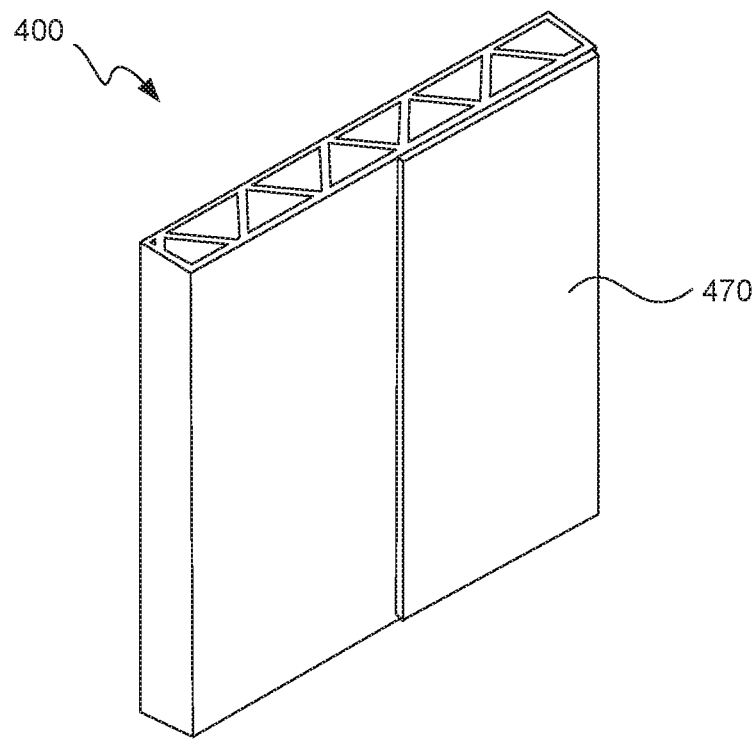
FIG. 4A illustrates in front perspective view an exemplary 3D printed building component having an overlying finishing layer according to one embodiment of the present disclosure.
Figure 4B:
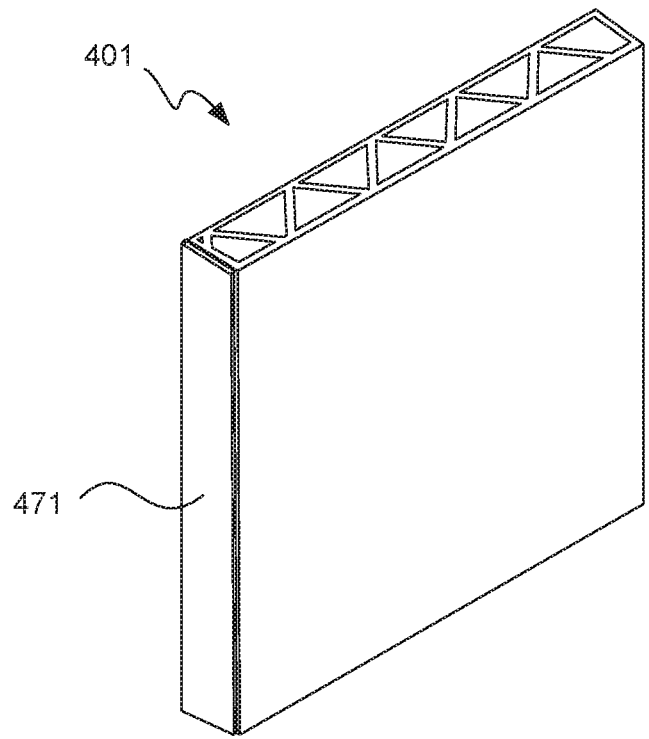
FIG. 4B illustrates in front perspective view an exemplary 3D printed building component having an overlying connective layer according to one embodiment of the present disclosure.

In various embodiments, one or more additional items or features can be formed in or added to a 3D printed building component after the printing process. For example, FIG. 4A shows an exemplary 3D printed building component having an overlying finishing layer in front perspective view. Printed building component 400 can be similar to printed building component 200 above. An overlying finishing layer 470 has been added to a surface region of the printed building component 400, which surface region can be an exterior or interior surface region. Finishing layer 470 can be, for example, stucco, paint, primer, a self-leveling floor, a roof, varnish, or a UV-protective coating. As another example, FIG. 4B shows an exemplary 3D printed building component having an overlying connective layer. Printed building component 401 can also be similar to printed building component 200 above. An overlying connective layer 471 has been added to a surface region of the printed building component 401. Connective layer 471 can be, for example, epoxy, adhesive, or a sealant coating. As one non-limiting example, connective layer 471 can be added at a surface that readily facilitates fastening printed building component 401 to another printed building component at a construction site.

It will be readily appreciated that transportation limitations and other logistical issues may limit the overall size at which 3D printed building structures and components can be printed. Accordingly, various 3D printed building components can be designed for joining or fastening together in a modular fashion. One or more connective layers 471 can be added to a building component at a manufacturing facility, construction site, or both. In addition, one or more surface regions of a printed building component that are intended for use with a connective layer 471 may have additional polymeric material added. For example, one or more exterior surface regions of an exterior member of a printed building component may have an increased thickness at the location(s) where fastening or connecting to another printed building component is intended. Such locations might be where a wall portion fastens to another wall portion, or where a wall portion fastens to a ceiling portion. Alternatively, or in addition, one or more mating surfaces on a printed building component may have integrally formed features designed for mating with another printed building component. These may include, for example, slots, extrusions, other interlocking features, and/or rougher surface areas designed for improved adhesion with a connective layer.

Figure 5A:
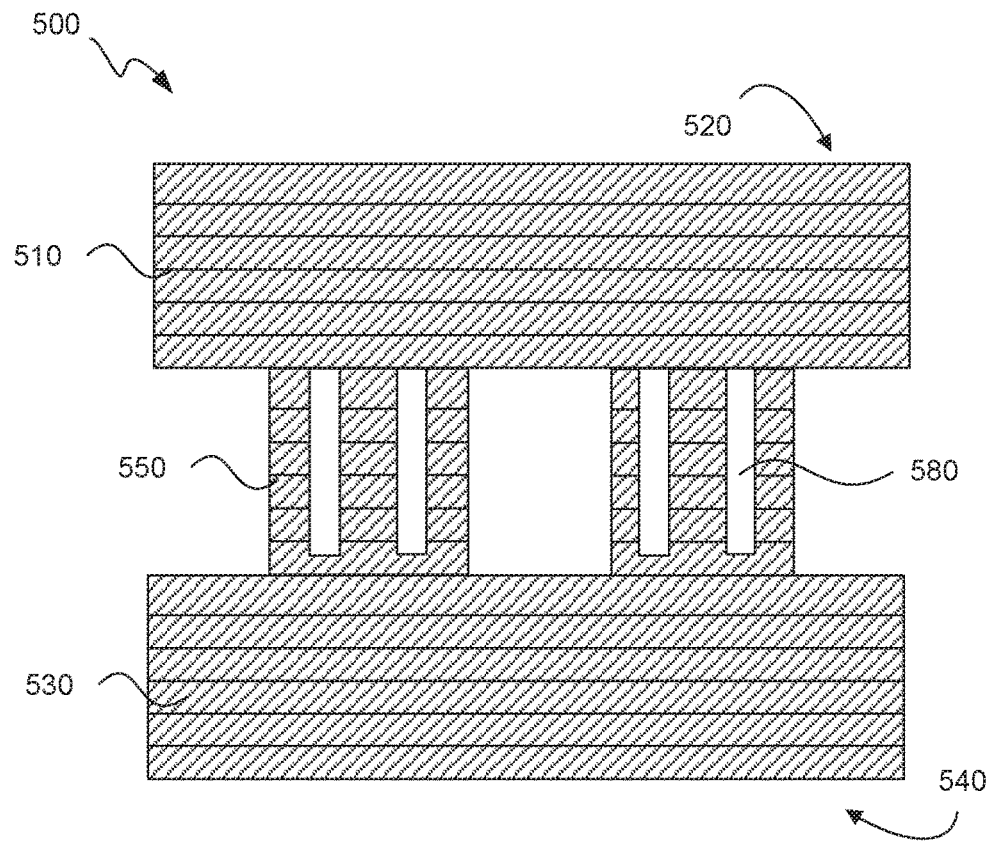
FIG. 5A illustrates in side cross-sectional view an exemplary 3D printed building component having a plurality of openings disposed between an exterior member and interior member according to one embodiment of the present disclosure.

Further additional features that can be formed in or added to a printed building component can include openings and filler material disposed therein. FIG. 5A illustrates in side cross-sectional view an exemplary 3D printed building component having a plurality of openings disposed between an exterior member and interior member. Printed building component 500 can include an exterior member 510 having an exterior surface region 520, an interior member 530 having an interior surface region 540, and a plurality of cross-members 550 spatially disposed between the exterior member 510 and the interior member 530. Each of the exterior member 510, interior member 530, and cross-members 550 can be formed from a multi-layered stack of polymeric material, such as that which is detailed above. A plurality of openings 580 can be disposed between the exterior member 510 and the interior member 530, such as within one or more of the cross-members 530. Openings 580 can be formed as part of the 3D printing process, which can form the entire printed building component as a monolithically integrated structure.

Figure 5B:
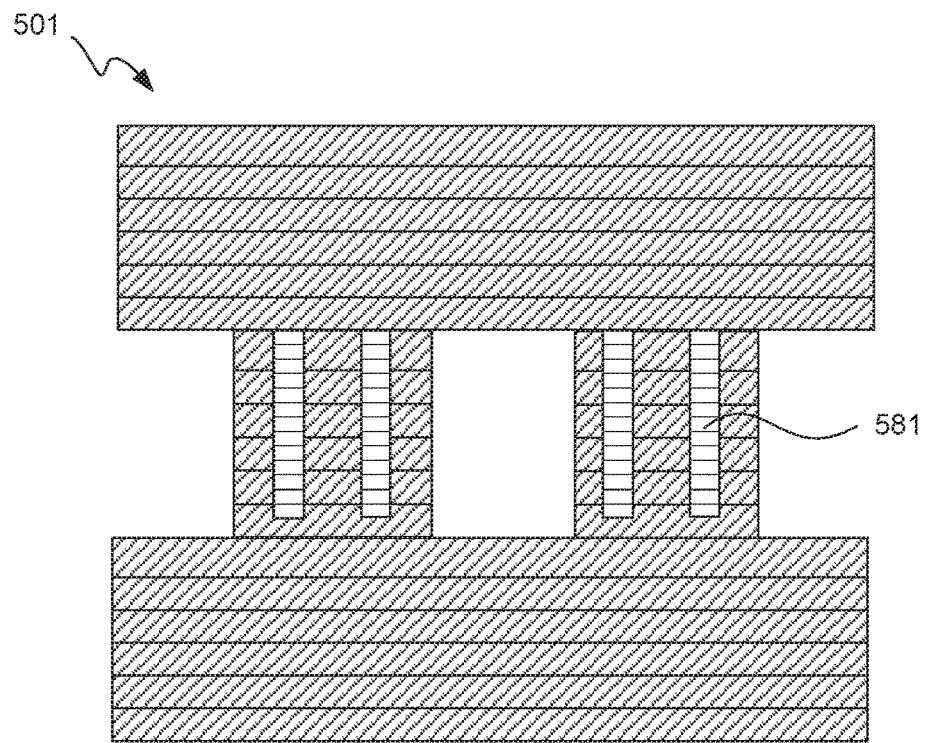
FIG. 5B illustrates in side cross-sectional view the exemplary 3D printed building component of FIG. 5A with a fill material disposed within the plurality of openings between an exterior member and interior member according to one embodiment of the present disclosure.

Continuing with FIG. 5B, the exemplary 3D printed building component of FIG. 5A is again shown in side cross-sectional view, but with a fill material disposed within the plurality of openings disposed between an exterior member and interior member. Printed building component 501 can include a fill material 581 that is spatially disposed within the plurality of openings 580. This can be accomplished during or after the 3D printing process that forms printed building component 501. Fill material can be, for example, an insulating material, a polyurethane foam, or a coconut fiber foam, among other possible fill materials.

Still further features that can be formed in a printed building component can include cavities that are configured to accommodate building components that cannot be or are not ordinarily printed. Such building components can include, for example, an electrical box, plumbing, electronic devices, and so forth. These cavities can be integrally formed in the polymeric material at the time of printing or can be formed within the polymeric material after the building, structure, or building component has been 3D printed.

Figure 6A:
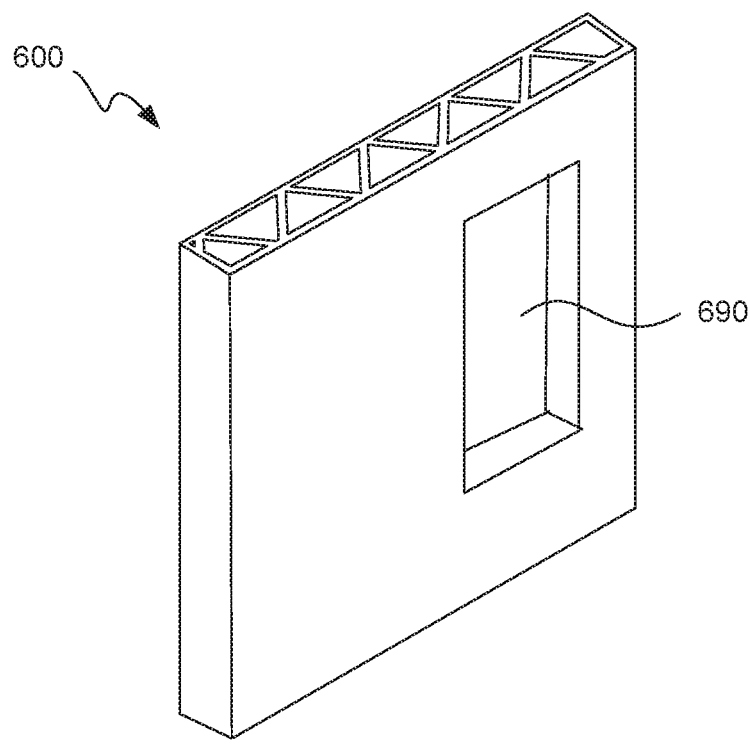
FIG. 6A illustrates in front perspective view an exemplary 3D printed building component having a cavity for an electrical box formed at an interior surface according to one embodiment of the present disclosure.

FIG. 6A illustrates in front perspective view an exemplary 3D printed building component having a cavity for an electrical box formed at an interior surface according to one embodiment of the present disclosure. Printed building component 600 can be similar to printed building component 200 above. A cavity 690 can be formed at an interior surface of an interior member of the printed building component. Cavity 690 can be specifically configured and dimensioned to hold an electrical box therein.

Figure 6B:
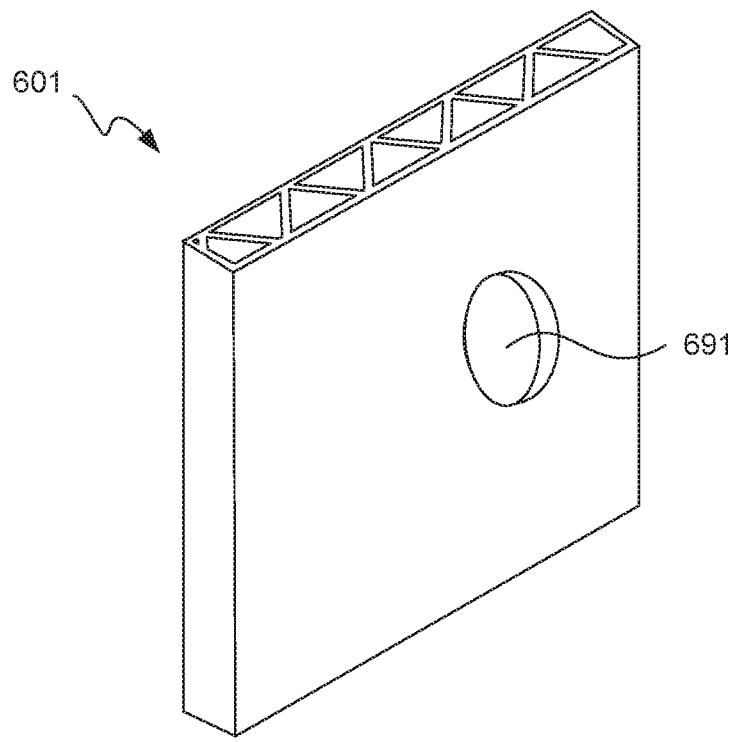
FIG. 6B illustrates in front perspective view an exemplary 3D printed building component having a plumbing cavity formed at an interior surface according to one embodiment of the present disclosure.

FIG. 6B illustrates in front perspective view an exemplary 3D printed building component having a plumbing cavity formed at an interior surface according to one embodiment of the present disclosure. Printed building component 601 can be similar to printed building component 200 above. A cavity 691 can be formed at an interior surface of an interior member of the printed building component, and this cavity 690 can be specifically configured and dimensioned to hold a pipe or other plumbing component therein.

While specific examples of cavities for an electrical box or plumbing component have been provided, it will be readily appreciated that cavities can be formed within various 3D printed buildings and building components for other types of devices and components. For example, cavities can be formed for various electronic devices, such as a thermostat, camera, or other sensing device.

Figure 7:
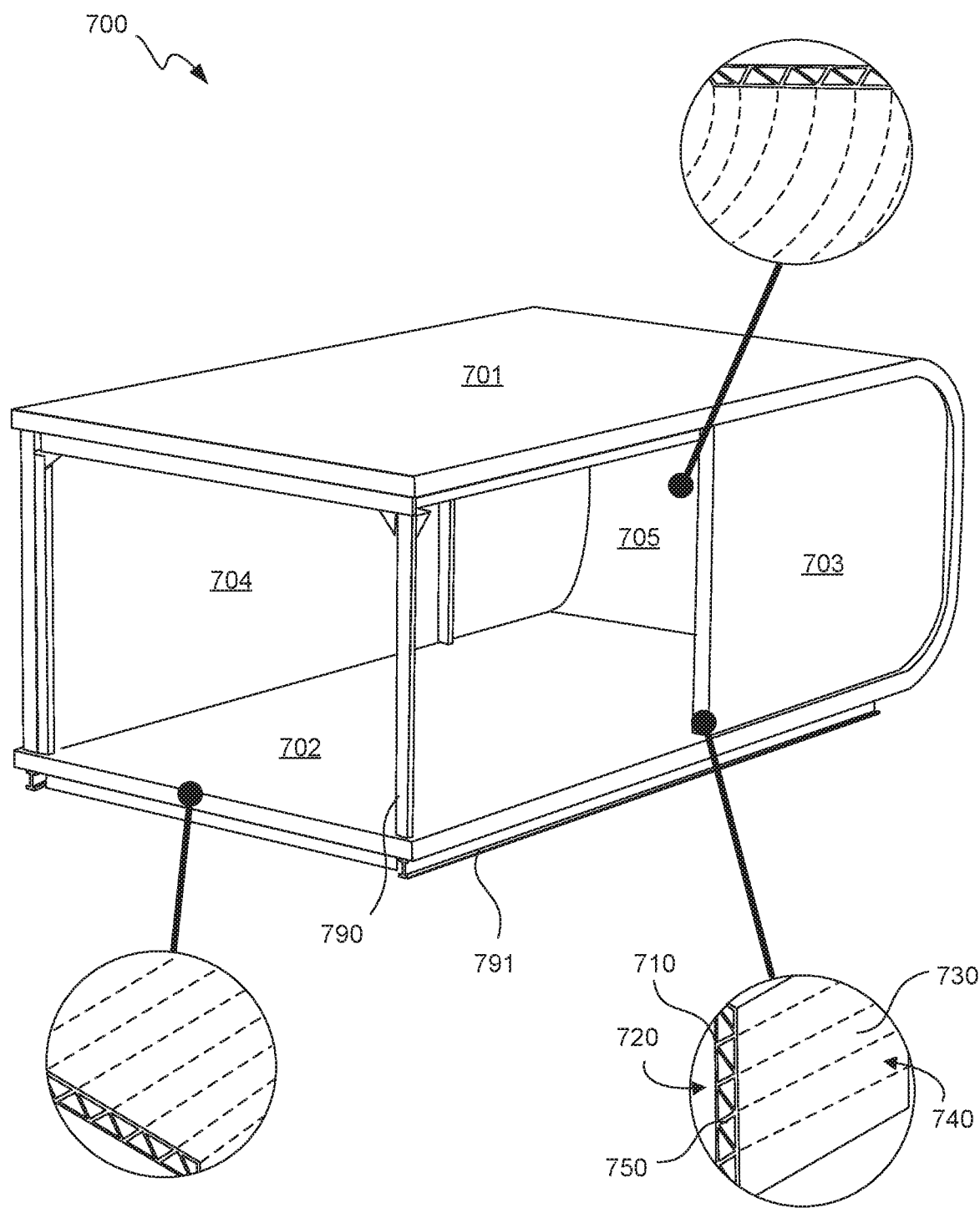
FIG. 7 illustrates in front perspective view an exemplary 3D printed building having a roof, floor, curved wall, and straight walls according to one embodiment of the present disclosure.

Finishing with FIG. 7, an exemplary 3D printed building having a roof, floor, curved wall, and straight walls is illustrated in front perspective view. Building 700 can have various printed portions that may be printed as a single monolithically formed entity and may be considered as a single building component. These various printed portions can include, for example, a roof 701, floor 702, front straight wall 703, back straight wall 704, and side curved wall 705. Some or all of these printed portions can include various features. For example, front straight wall 703 can include an exterior member 710 having an exterior surface region 720, an interior member 730 having an interior surface region 740, and a plurality of cross-members 750 spatially disposed between the exterior member 710 and the interior member 730. Each of the exterior member 710, interior member 730, and cross-members 750 can be formed from a multi-layered stack of polymeric material, such as that which is detailed above.

As shown in the different close-up views, floor 702 and side curved wall 705 may similarly have exterior members having exterior surface regions, interior members having interior surface regions, and cross-members. Although not shown, it will be readily appreciated that back straight wall 704 may be substantially similar to front straight wall 703 and that roof 701 may be substantially similar to floor 702 with respect to having similar features.

Building 700 may also have one or more additional items that are not formed from a multi=layered stack of polymeric material. For example, structural support column 790 may be formed from wood or steel, and foundational support 791 may be a I-beam or other item formed from steel or another material. In some variations, it is contemplated that even these support components 790 and 791 may be formed from a multi-layered stack of polymeric material.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A building component, comprising:
    a multi-layered stack of polymeric material having a stack thickness, the polymeric material having a methacrylic monomer, an inorganic hydrate and a light-induced polymerization agent, wherein the multi-layered stack is formed from a layer by layer three-dimensional printing process involving layer to layer chemical adhesion achieved by applying ultraviolet light to instantly cure extruded material;
    an exterior member formed from the multi-layered stack of polymeric material, the exterior member having an exterior surface region;
    an interior member formed from the multi-layered stack of polymeric material, the interior member having an interior surface region; and
    a plurality of cross-members formed from the multi-layered stack of polymeric material, wherein each of the plurality of cross-members is spatially disposed between the exterior member and the interior member.

2. The building component of claim 1, wherein the building component stands alone or is part of a plurality of specially designed components assembled together to form a part of a residential or commercial building.

3. The building component of claim 1, wherein the exterior member, the interior member, and the plurality of cross-members are all monolithically integrated to form the building component.

4. The building component of claim 1, wherein the stack thickness is about 6 to 150 mm and comprises 6 to 25 mm individual layers, each of the individual layers configured by extruding uncured polymeric material in a liquified state and solidifying the material into the layer to form the stack thickness.

5. The building component of claim 1, wherein each layer of polymeric material in the multi-layered stack has a layer thickness that ranges from about 6 to 25 mm.

6. The building component of claim 1, wherein the exterior surface region is characterized by a texture having a surface roughness of about 0 to 4 mm.

7. The building component of claim 1, wherein the exterior surface region has a height of about 2 to 10 mm per layer of the multi-layered stack of polymeric material.

8. The building component of claim 1, wherein the polymeric material at the exterior surface region includes an integrally formed finish with coarse-grained texture and with a line pattern caused by layer-by-layer extrusion.

9. The building component of claim 8, wherein the finish is marble-like having a flat surface and a non-foliated texture.

10. The building component of claim 1, further comprising:
    an overlying finishing layer of stucco, paint, primer, self-leveling floor, roof, varnish, or UV-protective coating.

11. The building component of claim 1, further comprising:
    an overlying connective layer of epoxy, adhesive, or sealant coating.

12. The building component of claim 1, wherein the exterior member and the interior member are configured in a parallel arrangement to form a building block.

13. The building component of claim 12, wherein the building block is shaped as a rectangle, a box, or a curved structure.

14. The building component of claim 1, further comprising:
    a plurality of openings disposed between the exterior member and the interior member.

15. The building component of claim 14, further comprising:
a fill material spatially disposed within the plurality of openings.

16. The building component of claim 15, wherein the fill material is an insulating material, a polyurethane foam, or a coconut fiber foam.

17. The building component of claim 1, wherein the interior surface region includes a cavity.

18. The building component of claim 17, wherein the cavity is configured for an electrical box, plumbing, or a sensing device.

19. The building component of claim 1, wherein the building component is fire resistant and characterized by a fire rating of class A, and a one-hour fire penetration with a flame spread index of 0-200 and a smoke developed index of 0-450.

20. The building component of claim 1, wherein the building component can withstand:
a minimum of 15 years of thermocycling from about −60 to +80 C,
the influence of natural moisture and salt, and
a load on the dowel of about 5 to 100 kg.

21. The building component of claim 1, wherein the multi-layered stack of polymeric material includes a coloring agent.

22. The building component of claim 1, wherein the multi-layered stack of polymeric material is hydrophobic.

23. The building component of claim 1, wherein the multi-layered stack of polymeric material is characterized by:
an ultimate compressive strength of 37±3 MPa along the layers and 50±4 MPa across the layers,
a compressive modulus of elasticity of 1900±130 MPa along the layers and 1400±460 MPa across the layers,
an ultimate tensile strength of 3.9±0.6 MPa along the layers and 2.7±0.2 MPa across the layers,
a tensile modulus of elasticity of 2100±750 MPa along the layers and 1100±170 MPa across the layers,
a thermal conductivity of about 0.1-0.8 W/(m·K),
a vapor permeability of about 1.7 perm·inch,
a thermal inertia of about 650-750 (J*m-2*K-1*sec-½), and
a porosity of less than about 3%.

24. A building, comprising:
one or more building components arranged to form at least a portion of a wall, floor, and roof for the building, wherein each of the one or more building components includes:
a multi-layered stack of polymeric material having a stack thickness, the polymeric material having a methacrylic monomer, an inorganic hydrate and a light-induced polymerization agent, wherein the multi-layered stack is formed from a layer by layer three-dimensional printing process involving layer to layer chemical adhesion achieved by applying ultraviolet light to instantly cure extruded material,
an exterior member formed from the multi-layered stack of polymeric material, the exterior member having an exterior surface region,
an interior member formed from the multi-layered stack of polymeric material, the interior member having an interior surface region,
a plurality of cross-members formed from the multi-layered stack of polymeric material, wherein each of the plurality of cross-members is spatially disposed between the exterior member and the interior member.

25. The building of claim 24, wherein at least one of the one or more building components forms a complete structural portion of the building, the complete structural portion including walls, floor and a roof.

26. The building of claim 24, wherein the building is a residential or commercial building.

27. The building of claim 24, exterior member, interior member, and plurality of cross-members for at least one of the one or more building components are all monolithically integrated.

28. The building of claim 24, wherein the stack thickness for at least one of the one or more building components is about 6 to 150 mm and comprises 6 to 25 mm individual layers, each of the individual layers configured by extruding uncured polymeric material in a liquified state and solidified into the layer to form the stack thickness.

29. The building of claim 24, wherein each layer of polymeric material in the multi-layered stack for at least one of the one or more building components has a layer thickness that ranges from about 6 to 25 mm.

30. The building of claim 24, wherein the exterior surface region for at least one of the one or more building components is characterized by a texture having a surface roughness of about 0 to 4 mm.

31. The building of claim 24, wherein the exterior surface region for at least one of the one or more building components has a height of about 2 to 10 mm per layer of the multi-layered stack of polymeric material.

32. The building of claim 24, wherein the polymeric material at the exterior surface region of at least one of the one or more building components includes an integrally formed finish with coarse-grained texture and with a line pattern caused by the layer-by-layer extrusion.

33. The building of claim 32, wherein the finish is marble-like having a flat surface and a non-foliated texture.

34. The building of claim 24, further comprising:
an overlying finishing layer of stucco, paint, primer, self-leveling floor, roof, varnish, or UV-protective coating on at least one of the one or more building components.

35. The building of claim 24, further comprising:
an overlying connective layer of epoxy, adhesive, or sealant coating on at least one of the one or more building components.

36. The building of claim 24, wherein the exterior member and the interior member of at least one of the one or more building components are configured in a parallel arrangement to form a building block.

37. The building of claim 36, wherein each building block is shaped as a rectangle, a box, or a curved structure.

38. The building of claim 24, further comprising:
a plurality of openings disposed between the exterior member and the interior member of at least one of the one or more building components.

39. The building of claim 38, further comprising:
a fill material spatially disposed within the plurality of openings of at least one of the one or more building components.

40. The building of claim 39, wherein the fill material is an insulating material, a polyurethane foam, or a coconut fiber foam.

41. The building of claim 24, wherein the interior surface region of at least one of the one or more building components includes a cavity.

42. The building of claim 41, wherein at least one cavity is configured for an electrical box, plumbing, or a sensing device.

43. The building of claim 24, wherein at least one of the one or more building components is fire resistant and characterized by a fire rating of class A, and a one-hour fire penetration with a flame spread index of 0-200 and a smoke developed index of 0-450.

44. The building of claim 24, wherein at least one of the one or more building components can withstand:
- a minimum of 15 years of thermocycling from about −60 to +80 C,
- the influence of natural moisture and salt, and
- a load on the dowel of about 5 to 100 kg.

45. The building of claim 24, wherein the multi-layered stack of polymeric material for at least one of the one or more building components includes a coloring agent.

46. The building of claim 24, wherein the multi-layered stack of polymeric material for at least one of the one or more building components is hydrophobic.

47. The building of claim 24, wherein the multi-layered stack of polymeric material for at least one of the one or more building components is characterized by:
- an ultimate compressive strength of 37±3 MPa along the layers and 50±4 MPa across the layers,
- a compressive modulus of elasticity of 900±130 MPa along the layers and 1400±460 MPa across the layers,
- an ultimate tensile strength of 3.9±0.6 MPa along the layers and 2.7±0.2 MPa across the layers,
- a tensile modulus of elasticity of 2100±750 MPa along the layers and 1100±170 MPa across the layers,
- a thermal conductivity of about 0.1-0.8 W/(m·K),
- a vapor permeability of about 1.7 perm·inch,
- a thermal inertia of about 650-750 ($J*m-2*K-1*sec-\frac{1}{2}$), and
- a porosity of less than about 3%.

* * * * *